July 26, 1960 W. R. WISNER 2,946,641
LAMP MANUFACTURE
Filed Aug. 28, 1957 3 Sheets-Sheet 1

INVENTOR.
WILLIAM R. WISNER
BY Clarence R. Patty Jr.
ATTORNEY

July 26, 1960 W. R. WISNER 2,946,641
LAMP MANUFACTURE
Filed Aug. 28, 1957 3 Sheets-Sheet 2

INVENTOR.
WILLIAM R. WISNER
BY Clarence R. Patty, Jr.
ATTORNEY

July 26, 1960  W. R. WISNER  2,946,641
LAMP MANUFACTURE
Filed Aug. 28, 1957  3 Sheets-Sheet 3

INVENTOR.
WILLIAM R. WISNER
BY Clarence R. Patty, Jr.
ATTORNEY

United States Patent Office 2,946,641
Patented July 26, 1960

2,946,641
LAMP MANUFACTURE

William R. Wisner, Painted Post, N.Y., assignor to Corning Glass Works, Corning, N.Y., a corporation of New York Filed Aug. 28, 1957, Ser. No. 680,752

1 Claim. (Cl. 316—19)

The present invention relates to incandescent lamps and their manufacture.

Various types of incandescent lamps are made in vast quantities and sold at highly competitive prices. For this reason any change in a lamp structure or the method of its manufacture that effects even a minor saving in its per unit cost is greatly to be desired.

With the foregoing end in view a number of alternative lamp structures have been developed.

According to one form of the invention, a lamp envelope with a moil-free neck is employed with a mount arranged in the envelope embodying an evacuating tube provided with a bulbous portion about which the free end of the neck is sealed; the lead-in wires being sealed between such bulbous portion and the bulb neck before evacuation and tip off.

According to a second form of the invention, the lamp envelope is used with the moil thereon as it comes from a forming machine and employs the same form of mount as in the preceding example. In this second form of lamp however, the two opposite sides of the neck have apertures pierced therethrough through which the lead-in wires are threaded and sealed. The region of the neck wall surrounding the bulbous portion of the mount, at a level below the exit of the lead-in wires, is then sealed thereto and about the lower adjacent region of the mount. The moil portion of the lamp neck is then tipped off with the lower end of the mount folowing evacuation of the lamp.

According to a third form of the invention, the lamp envelope may be formed with a threaded neck. In this case the one lead-in wire is brought through the lamp wall near the junction of the threads with the bulb as in the second form of the invention and there terminated in a bead of solder. The other lead-in wire is brought out of the lamp between the bulbous portion of the mount and the lamp neck, as in the first example. After evacuating and sealing off the lamp as in the first form of the invention, the other lead-in wire is attached to an end cap and cemented to the lamp. The neck threads are then metallized and connection thus made to the lead-in wire passing through the lamp neck wall.

According to a still further form of the invention, especially suitable for miniature lamps, the envelope as taken from a forming machine, is pierced as in the second described example, but the lamp mount simply comprises a bead supporting the lead-in wires and filament. Evacuation of the lamp is then effected through the lamp neck directly as it is being tipped off.

For a better understanding of the invention reference may be had to the accompanying drawings, wherein.

Figure 1:
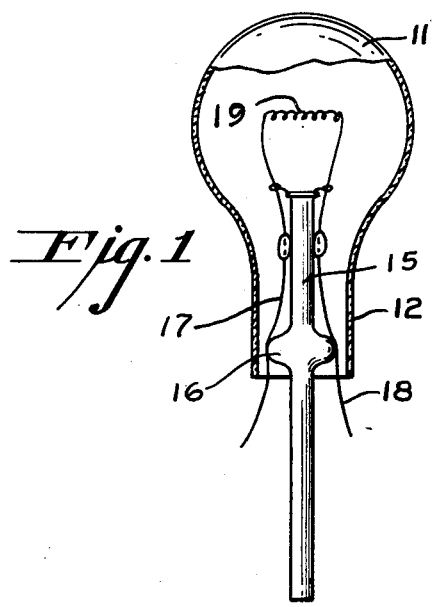
Fig. 1 is a side elevation of a bulb, partly broken away, showing a mount embodying a tubular evacuating tube with a bulbous portion and trailing lead-in wires in position to be embodied in a seal between such bulbous portion and the lamp neck.

Referring to Figs. 1 through 4 of the drawings in detail, a lamp envelope is shown comprising a bulbous portion 11 and a tubular or neck portion 12 from which excess cullet has been trimmed. Projected into the envelope is an assembly comprising a tubular glass mount 15 having a bulb portion 16 and provided with trailing lead-in wires 17 and 18 bridged by a filament 19.

Figure 2:
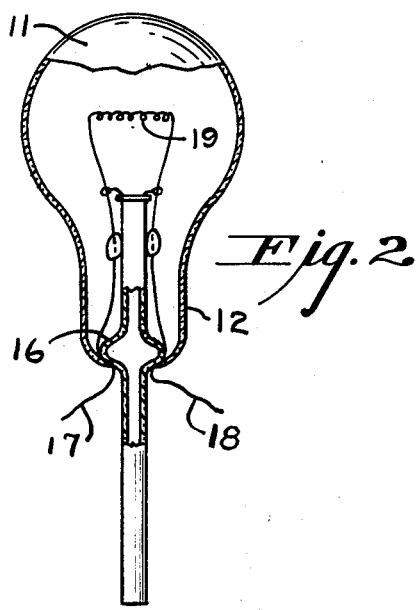
Fig. 2 is a similar view showing the lamp envelope neck sealed about the bulbous portion of the tube mount and about the lead-in wires.
Figure 3:
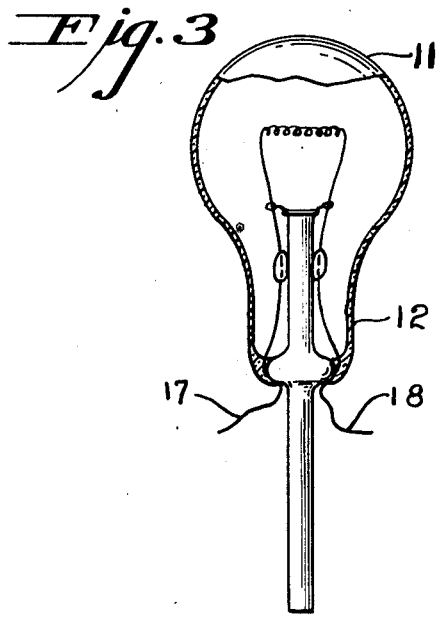
Fig. 3 is a similar view showing a further stage of joining the envelope neck to the mount.

By application of suitable heating flames to the lower end of the tubular portion 12 it is softened and by surface tension brought into sealing engagement with the bulbous portion 16 of the mount 15, as shown in Fig. 2. Preferably the seal region of the tubular portion is further heated and marvered by suitable rollers to the form shown in Fig. 3.

Figure 4:
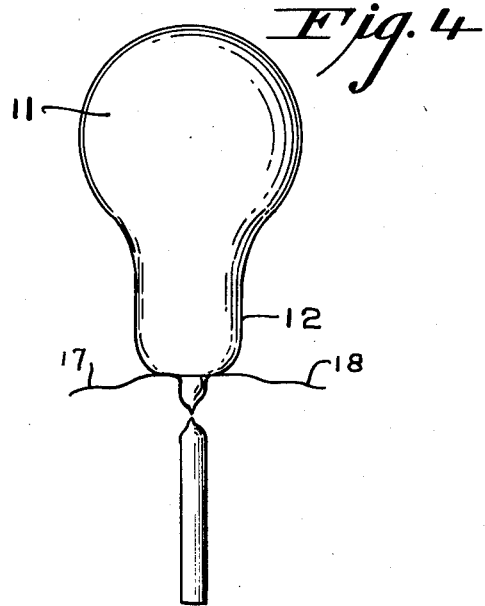
Fig. 4 shows the lamp after evacuation and tip off.
Figure 5:
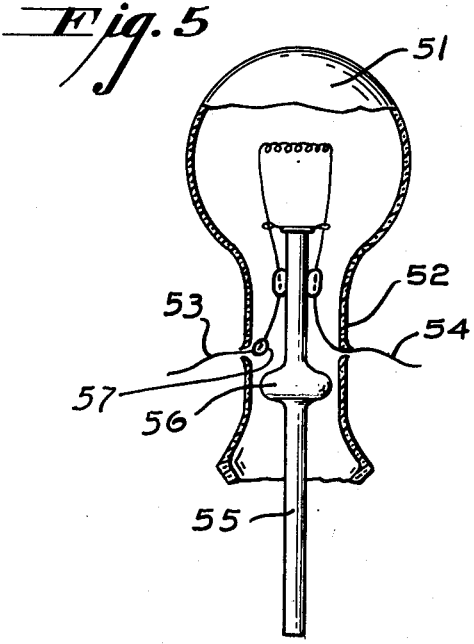
Figs. 5 through 8 are views, similar to Figs. 1 through 4, involving an alternative form of structure and method of manufacture.
Figure 6:
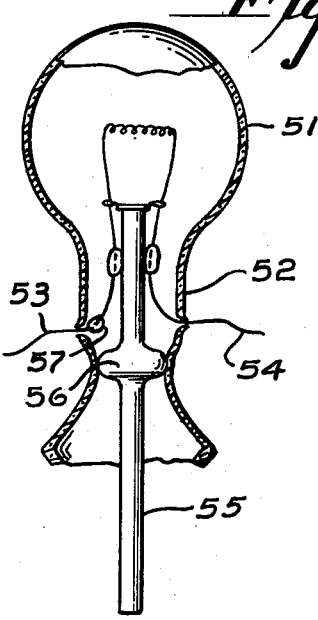
Figure 7:
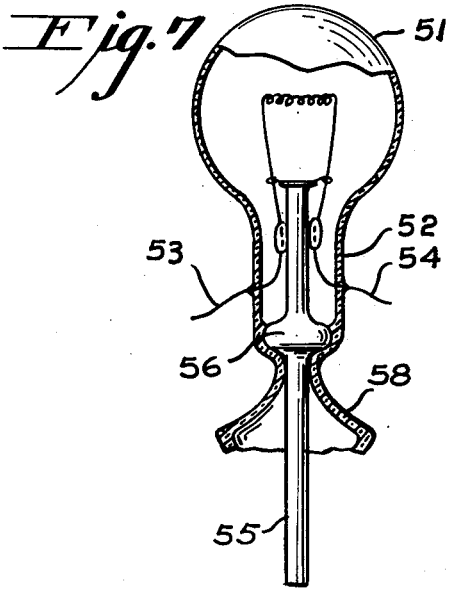

The bulb is then evacuated and tipped off in a conventional manner to the form shown in Fig. 4 in readiness for provision of a suitable base.

Referring now to Figs. 5–8, the lamp envelope comprises a bulbous portion 51 and a tubular portion 52 as it comes from a forming machine; and is provided on two opposite sides of the tubular portion with perforations through which trailing lead-in wires 53 and 54 pass. Lead-in wires 53 and 54 are attached to a tubular mount 55, similar to the mount 15 hereinbefore described, provided with a bulbous portion 56.

The mount 55 is projected into the envelope a sufficient distance to direct the ends of lead-in wires 53 and 54 into the perforations and is then withdrawn to the position shown.

Figure 8:
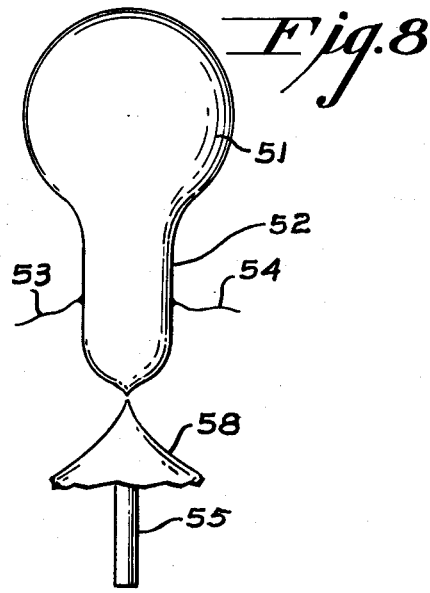

The region of tubular portion 52 of the envelope surrounding bulbous portion 56 of the mount is then heated and sealed thereto and the neck bulb wall sealed about the lead-in wires. If desired each lead-in wire such as 53 can be provided with a glass bead such as 57 to which the aperture bordering edge of the neck 52 may be sealed. The bulb neck is then preferably further heated and marvered to the configuration shown in Fig. 7. After subsequent evacuation of the bulb the excess portion of the mount 55 and of the moil portion 58 of the lamp are tipped off concurrently as illustrated in Fig. 8.

Figure 9:
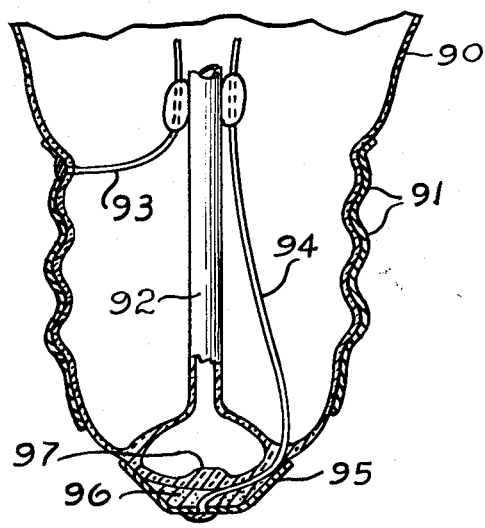
Fig. 9 is a greatly enlarged sectional view of a fragment of a further form of lamp embodying the invention.
Figure 10:
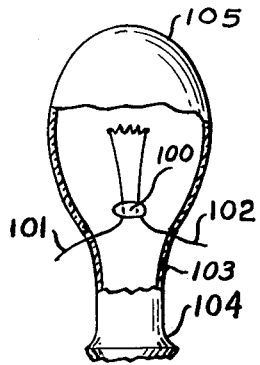
Figs. 10 through 13 are views similar to Figs. 1 through 4, of still another lamp with a part of the envelope broken away and illustrating the respective steps of its manufacture.
Figure 11:
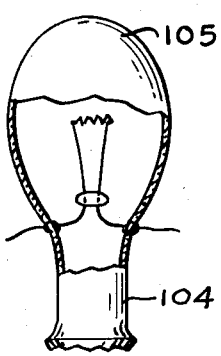
Figure 12:
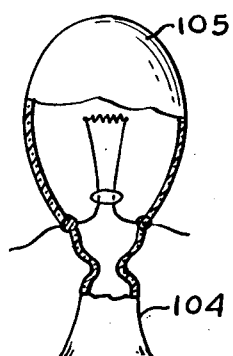
Figure 13:
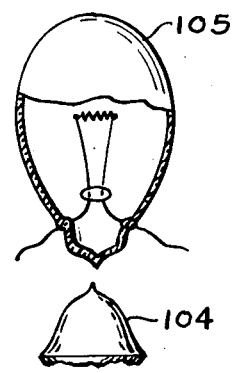
Figure 14:
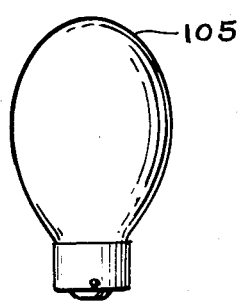
Fig. 14 is a side elevation of a completed lamp made in accordance with the procedure illustrated in Figs. 10–13.

In the form of lamp shown in Fig. 9 the tubulation of the bulb 90 has threads 91 formed therein and embodies a mount 92 having trailing lead-in wires 93 and 94. The mount 92 is similar to mounts 15 and 55, but has its lead-in wire 93 passing through the tubular portion of the bulb as in the structure of Figs. 5–8 and with the lead-in wire 94 passing between the bulbous portion of the mount 92 and such tubular portion as in the structure of Figs. 1 through 4. Lead-in wire 93 is terminated as shown in a bead of solder and is connected with the threaded neck 91 of the bulb by application of a conductive coating 95 thereto. In this structure, after tip off, the stub of mount 92 is further heated and worked back up into the bulbous portion as indicated at 97. The lead-wire 94 is threaded through and soldered to an end cap 95 which is then attached to the bulb base by means of a suitable cement 96.

The lamp and method of Figs. 10–13 are similar to that described with respect to Figs. 5–8 except a smaller bulb 105 is used and the filament mount simply comprises a glass bead 100 having trailing lead-in wires 101 and 102. Exhausting of the lamp is effected directly through its tubular portion 103 from which the moil 104 is tipped off following evacuation of the lamp.

What is claimed is:

The method of manufacturing an incandescent lamp comprising a glass bulbous envelope having an adjoining tubular portion with its outer end closed by a glass filament mount, which includes perforating two opposite side wall areas of the neck below the region of its junction with its bulb portion, projecting a filament mount with trailing lead-in wires into the bulb portion of the envelope, retracting the mount somewhat while guiding the free ends of the lead-in wires laterally through such perforations, sealing the lead-in wires in the neck wall, directing heat into the surrounding glass of the tubular portion to shrink its outward end region into sealing relation with the periphery of the mount, evacuating the bulb via its mount, sealing off the mount while separating the excess glass of the bulb neck and mount from the bulb, and further heating and marvering the tubular portion of the bulb in the seal region thereof to a desired final configuration.

References Cited in the file of this patent

UNITED STATES PATENTS

| | | |
|---|---|---|
| 317,171 | Muller | May 5, 1885 |
| 709,996 | McBerty et al. | Sept. 30, 1902 |
| 2,327,622 | Craig | Aug. 24, 1943 |
| 2,359,483 | Kuebler | Oct. 3, 1944 |
| 2,361,469 | Flaws | Oct. 31, 1944 |
| 2,685,762 | Mullan | Aug. 10, 1954 |
| 2,791,480 | Larson | May 7, 1957 |